United States Patent [19]

Sato et al.

[11] Patent Number: 5,589,947
[45] Date of Patent: Dec. 31, 1996

[54] KARAOKE SYSTEM HAVING A PLURALITY OF TERMINAL AND A CENTER SYSTEM

[75] Inventors: Masuhiro Sato; Naoto Inaba, both of Tokyo-to, Japan

[73] Assignee: Pioneer Electronic Corporation, Tokyo, Japan

[21] Appl. No.: 345,543

[22] Filed: Nov. 28, 1994

Related U.S. Application Data

[63] Continuation of Ser. No. 124,704, Sep. 21, 1993, abandoned.

[30] Foreign Application Priority Data

Sep. 22, 1992 [JP] Japan ................................. 4-252851

[51] Int. Cl.$^6$ ............................... H04N 5/76; G10H 7/00
[52] U.S. Cl. ...................... 386/96; 358/343; 358/335; 360/19.1; 360/33.1; 84/645; 348/13; 386/98; 386/102
[58] Field of Search .................... 358/335, 341, 358/343, 342; 360/14.1, 14.2, 14.3, 19.1, 33.1; 348/7, 13; 434/307 A, 307 R, 308, 318; 84/645; H04N 5/76; G10H 7/00

[56] References Cited

U.S. PATENT DOCUMENTS

| | | | |
|---|---|---|---|
| 5,127,303 | 7/1992 | Tsumura et al. | 360/32 |
| 5,194,682 | 3/1993 | Okamura et al. | 84/625 |
| 5,250,747 | 10/1993 | Tsumura | 358/342 |
| 5,262,875 | 11/1993 | Mincer et al. | 358/335 |

*Primary Examiner*—Tommy P. Chin
*Assistant Examiner*—Khoi Truong
*Attorney, Agent, or Firm*—Kane, Dalsimer, Sullivan, Kurucz, Levy, Eisele and Richard, LLP

[57] ABSTRACT

A karaoke system includes a plurality of terminal systems respectively reproducing music and video images of music pieces, and a center system connected to the plurality of terminal systems. The center system includes a musical performance information storage unit for storing digital performance information relating to music pieces to be reproduced and video image control information relating to video images to be reproduced simultaneously with the music, a plurality of music information generators for generating music information of the music piece on the basis of the digital performance information, video image storage unit for storing a plurality of video images, video image generator for generating a video image from the video image storage unit in accordance with the video image control information, and information transmitter for transmitting the digital performance information and the reproduced video image to the plurality of terminal systems. Each of the plurality of terminal systems includes music information generator unit for generating music information of the music piece on the basis of the transmitted digital performance information, music information reproducer for reproducing the generated music information as musical sound, and video image reproducer for reproducing the transmitted video images simultaneous with the music information.

8 Claims, 9 Drawing Sheets

KARAOKE SYSTEM HAVING A PLURALITY OF TERMINAL AND A CENTER SYSTEM

This application is a continuation of U.S. patent application Ser. No. 08/124,704, filed Sep. 21, 1993, now abandoned.

BACKGROUND OF THE INVENTION

1. Field of the Invention

The present invention relates to a "karaoke" system supplying signals of musical performance and video images relevant to the musical performance to a plurality of terminals from a center system which constitutes a part of a CATV system, a CCTV system, etc. More particularly, the present invention is concerned with a karaoke system using digital musical performance information conforming to a MIDI (Musical Instrument Digital Interface) standard or the like.

2. Description of the Prior Art

Conventionally, a CCTV (Closed Circuit Television) karaoke system is known in which karaoke is provided by means of a CCTV system utilized in limited facilities, such as a building and identical grounds. The CCTV karaoke system is incorporated with services to individual rooms in a hotel or the like, or provides a karaoke service in which a building has a large number of rooms to each of which karaoke is provided.

FIG. 1 shows the structure of is a conventional CCTV karaoke system. As shown in FIG. 1, the conventional CCTV karaoke system includes a CCTV center system 100 and terminal systems R1, R2, . . . respectively provided in rooms in which music performance is carried out. The CCTV center system 100 and the terminal systems R1, R2, . . . are connected to each other by means of cables, and two-way communications take place between these systems. For example, requests are transmitted from the terminal systems R1, R2, . . . to the CCTV center system 100, which transmits signals of music pieces to be played and relevant video images to the terminal systems R1, R2, . . .

Each of the terminal systems R1, R2, . . . is made up of a CCTV converter 130, a mixing amplifier 131, a speaker 132, a microphone 133, a television set 134 and a remote controller 135. The CCTV converter 130 transfers information concerning a requested music piece set by an operation on the remote controller 135 to the CCTV center system 100. Further, the CCTV converter 130 receives a television signal transmitted via the cable, and separates the received television signal into a video signal and an audio (stereo) signal. The video signal is sent to the television set 134, and the audio signal is sent to the speaker 132 via the mixing amplifier 131. In this manner, the requested music pieces are played and the relevant video images are displayed.

The CCTV center system 100 is made up of a terminal controller 101, a commander 102, an RF mixer 103, a laser-vision disk (LD) automatic changer/player units, 111, 112, . . . , and television modulators 121, 122, 123, 124, . . . The terminal controller 101 performs the management and control of the center system 100, as well as control of communications with the terminal systems R1, R2, . . . The terminal controller 101 receives requests for musical performance from the terminal systems R1, R2, . . . , and sends related instructions to the commander 102. The commander 102 controls the LD automatic changer/player units 111,112, . . . , (each having two players and outputs), so that signals of the performance of the requested music pieces and the related video images are reproduced from laser-vision disks.

Then, the video signals and the musical performance signals are converted into RF signals by the television modulators 121,122, . . . , and are transmitted, via the RF mixer 103, to the terminal systems which have issued the requests. In the above manner, the requested music pieces are played and the related video images are displayed in each of the terminal systems.

The CCTV center system as described above uses the LD automatic changer/player units, each of which accommodates laser-vision disks equal in number to music pieces, each of the disks storing the audio and video signals of a music piece. In response to a request for musical performance, an idle LD automatic changer/player unit is selected under the control of the terminal controller 101, and one of the laser-vision disks corresponding to the requested music is selected and played. The video and audio signals reproduced from the selected laser-vision disk are transmitted to the terminal system which has issued the above request.

However, the above-mentioned conventional CCTV center system has the following disadvantage. In order to process a number of requests, the CCTV center system must be equipped with a plurality of LD automatic changer/player units at a certain ratio thereof to the rooms to which the karaoke services are provided. Hence, it is necessary to increase the number of LD automatic changer/player units to be provided in proportion to the number of rooms, so that the equipment investment is increased and the space for placing the LD automatic changer/player units is also increased in proportion to the number of changer/player units.

Further, the LD automatic changer/player units are allowed to accommodate a limited number of disks. Nowadays, an increased number of new disks is released. The services of newly released disks can be provided by extending the LD automatic changers of the units. However, in this case, it is necessary to extend the automatic changers in all the LD automatic changer/player units of the system. This is troublesome in terms of the cost and the space.

SUMMARY OF THE INVENTION

It is an object of the present invention to eliminate the above disadvantages and provide a karaoke system capable of flexibly coping with an increase in the number of rooms to which the karaoke services are provided and an increase in the number of disks while increase in the cost and the space for the placement can be suppressed.

According to one aspect of the present invention, there is provided a karaoke system including a plurality of terminal systems respectively reproducing music and video images of music pieces, and a center system connected to the plurality of terminal systems. The center system includes a musical performance information storage unit for storing digital performance information relating to music pieces to be reproduced and video image control information relating to video images to be reproduced simultaneously with the music, a plurality of music information generators for generating music information of the music piece on the basis of the digital performance information, video image storage unit for storing a plurality of video images, video image generator for generating a video image from the video image storage unit in accordance with the video image control information, and information transmitter for transmitting the digital performance information and the reproduced video image to the plurality of terminal systems. Each of the plurality of terminal systems includes music information generator for generating music information of the music piece on the basis of the transmitted digital performance information, music information reproducer for reproducing the generated music information as musical sound, and video image reproducer for reproducing the transmitted video images simultaneous with the music information.

According to another aspect of the present invention, there is provided a karaoke system including a plurality of terminal systems respectively reproducing music and video images of music pieces, and a center system connected to the plurality of terminal systems. The center system includes a musical performance information storage unit for storing digital performance information relating to music pieces to be reproduced and video image control information relating to video images to be reproduced simultaneously with the music, musical performance information transmitter for transmitting the digital performance information to the plurality of terminal systems, video image storage unit for storing a plurality of video images, video image generator for generating a video image from the video image storage unit in accordance with the video image control information, and video information transmitter for transmitting the reproduced video image to the plurality of terminal systems. Each of the plurality of terminal systems includes music information generator for generating music information of the music piece on the basis of the transmitted digital performance information, music information reproducer for reproducing the generated music information as musical sound, and video image reproducer for reproducing the transmitted video images simultaneous with the music information.

In the karaoke system according to the present invention, a signal of music to be performed is generated from digital performance information conforming to, for example, the MIDI standard, so that accompaniment can be provided.

More particularly, in the center system, digital performance information relating to music pieces stored in the performance information storage unit is selected, and music signal to be reproduced is generated. The music signal to be played is transmitted the terminal systems. In each of the terminal systems, musical performance is carried out using the received signal. Further, the center system is equipped with the video image storage unit that stores a plurality of video images. The video images corresponding to the music signal is selected and a video signal is derived from the video image storage unit. The video signal thus generated is transmitted to the terminal systems. Selection of video image information is performed by the video control information stored, together with the digital performance information, in the performance information storage unit, and video images suitable for the played music are transmitted to the terminal systems. Further, in each of the terminal systems, it is possible to display words on video images by storing words information in the performance information storage unit and generating a words signal from the words information in synchronism with generation of the music signal of the played music and by superimposing the generated signal on the video signal.

According to the present invention, information concerning musical performance is stored and reproduced as digital performance information. Hence, it is possible to equip the center station a number of sound source units corresponding to the number of terminal systems. Hence, music newly released can be added in the form of digital performance information. Further, a large quantity of digital performance information concerning a large number of music pieces can be stored in a small-scale device. Nowadays, compact, high-performance sound source units are available, and hence the center system can be flexibly modified in accordance with an increased number of terminal systems or newly released music.

In the above karaoke system, each of the terminal systems can be equipped to a performance request unit, and the center system can be equipped with a transmitting/receiving control unit. Hence, the center system can select digital performance information concerning music pieces requested from the terminal systems and the signals of the requested music pieces can be provided to the terminal systems that have requested musical performance. Further, it is possible to provide the center system with a performance information input unit connected to a digital communications line circuit such as an ISDN (Integrated Services Digital Network). With the above structure, it is possible to easily add digital performance information concerning newly released music.

The nature, utility, and further features of this invention will be more clearly apparent from the following detailed description with respect to preferred embodiments of the invention when read in conjunction with the accompanying drawings briefly described below.

DESCRIPTION OF THE PREFERRED EMBODIMENTS

Figure 1:
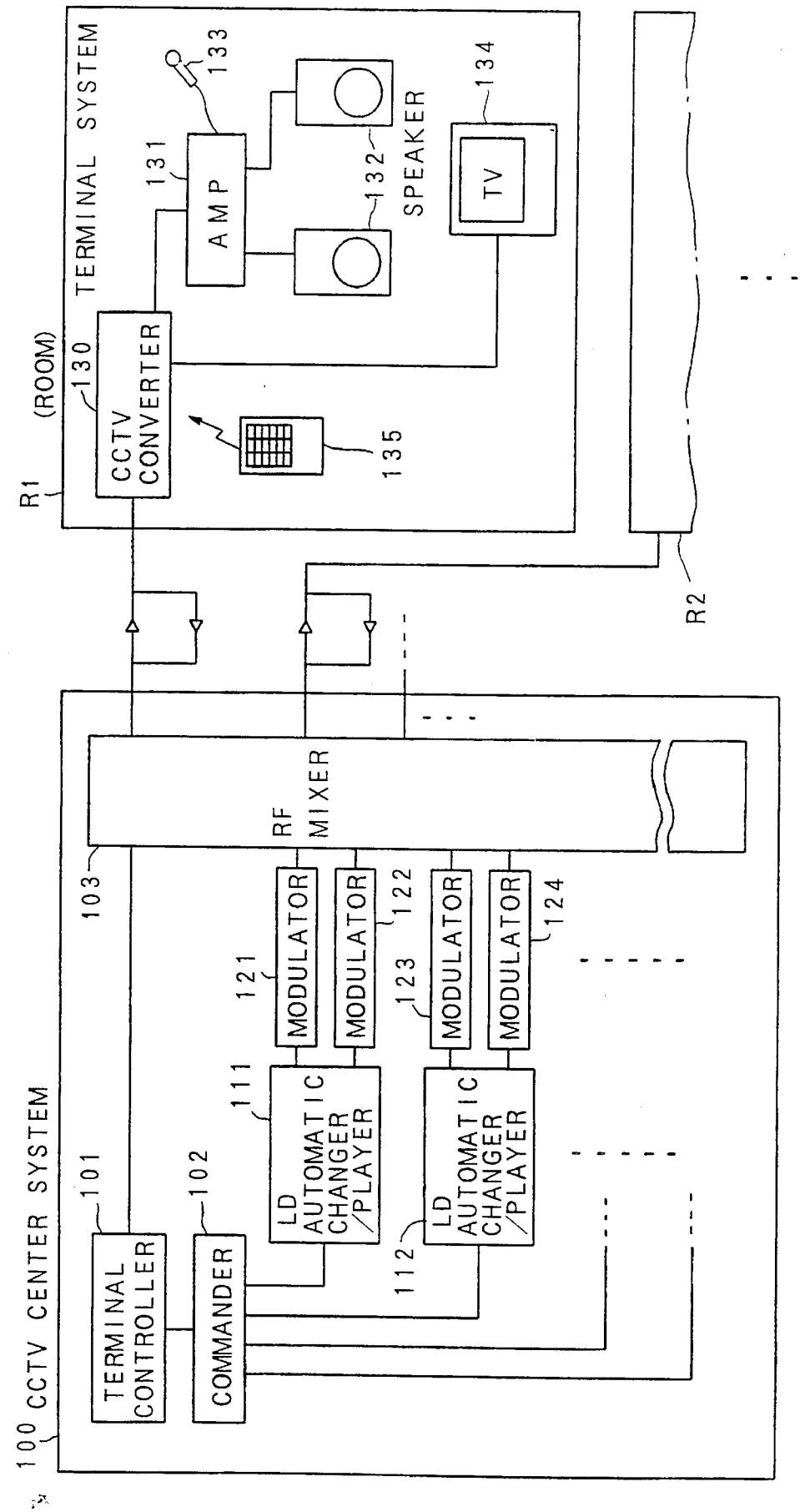
FIG. 1 is a block diagram of the structure of a conventional CCTV karaoke system.
Figure 2:
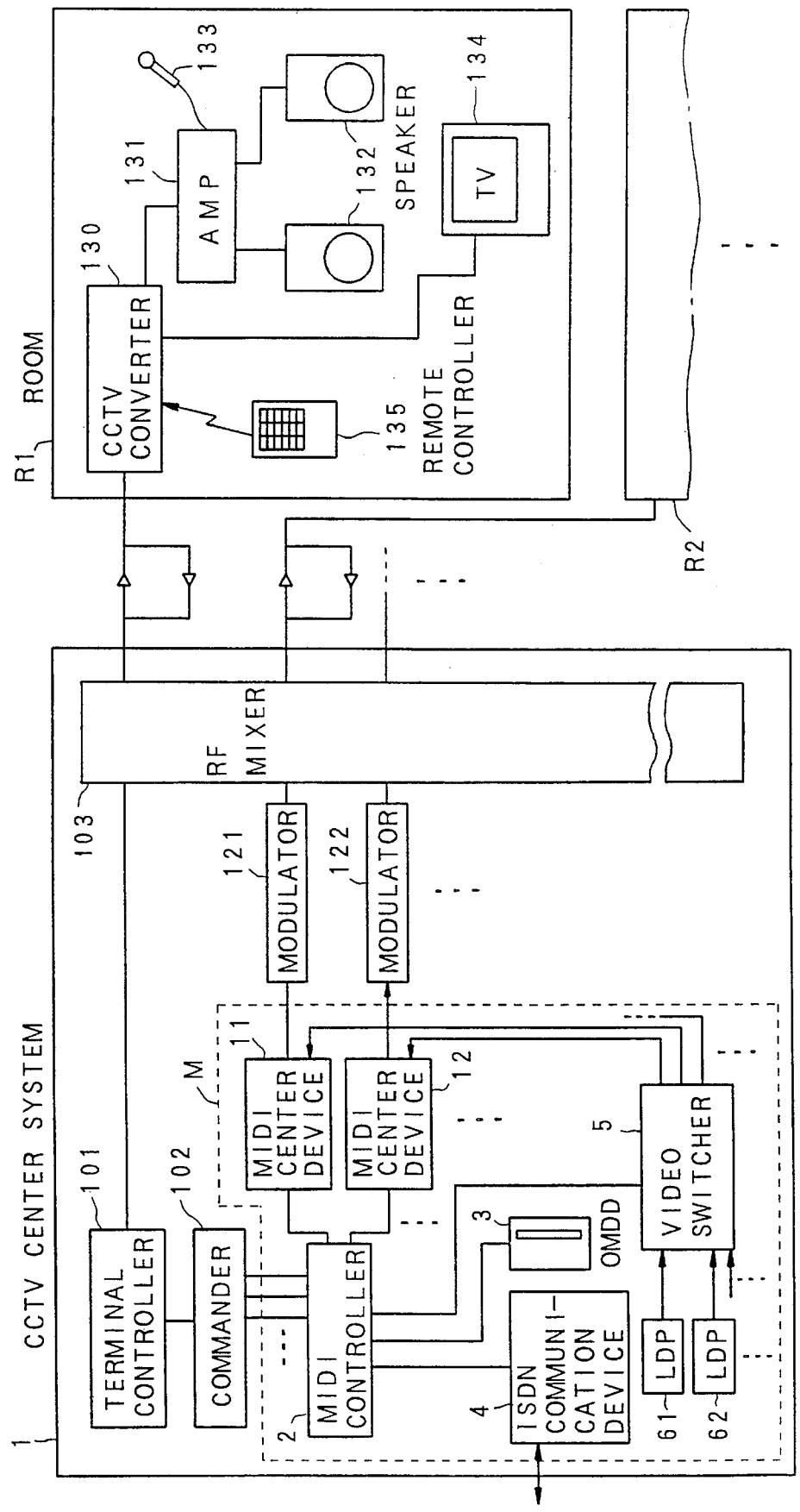
FIG. 2 is a block diagram of the structure of a CCTV karaoke system according to a first embodiment of the present invention.

1st Embodiment:

FIG. 2 illustrates the structure of a CCTV karaoke system according to a first embodiment of the present invention. In FIG. 2, terminal systems R1, R2, . . . are the same as the conventional ones shown in FIG. 1, and a detailed description thereof will be omitted. Further, terminal controller 101, commander 102, RF mixer 103 and modulators 121, 122, . . . of a CCTV center system 1 are the same as or equivalent to those shown in FIG. 1, and a detailed description thereof will be omitted. In the CCTV karaoke system shown in FIG. 2, the CCTV center system 1 and the terminal systems R1, R2, . . . are connected to each other via cables and the two-way communications take place between these systems. For example, requests are transmitted to the CCTV center system 1 from the terminal systems R1, R2, . . . , and the CCTV center system 1 generates signals of requested pieces of music and related video images and transmit the above signals to the terminal systems R1, R2, . . . The first embodiment is characterized in that the CCTV center system 1 is equipped with a MIDI reproduction system M, which generates audio signals of music pieces and related video images.

As indicated by a dot-chained line shown in FIG. 2, the MIDI reproduction system M is made up of a MIDI controller 2, MIDI center devices 11, 12, . . . , an OMDD (Optical Memory Disk Driver) 3, an ISDN (Integrated Services Digital Network) communications device 4, a video switcher 5, and LDPs (Laser-vision Disk Players) 61, 62, . . .

Figure 3:
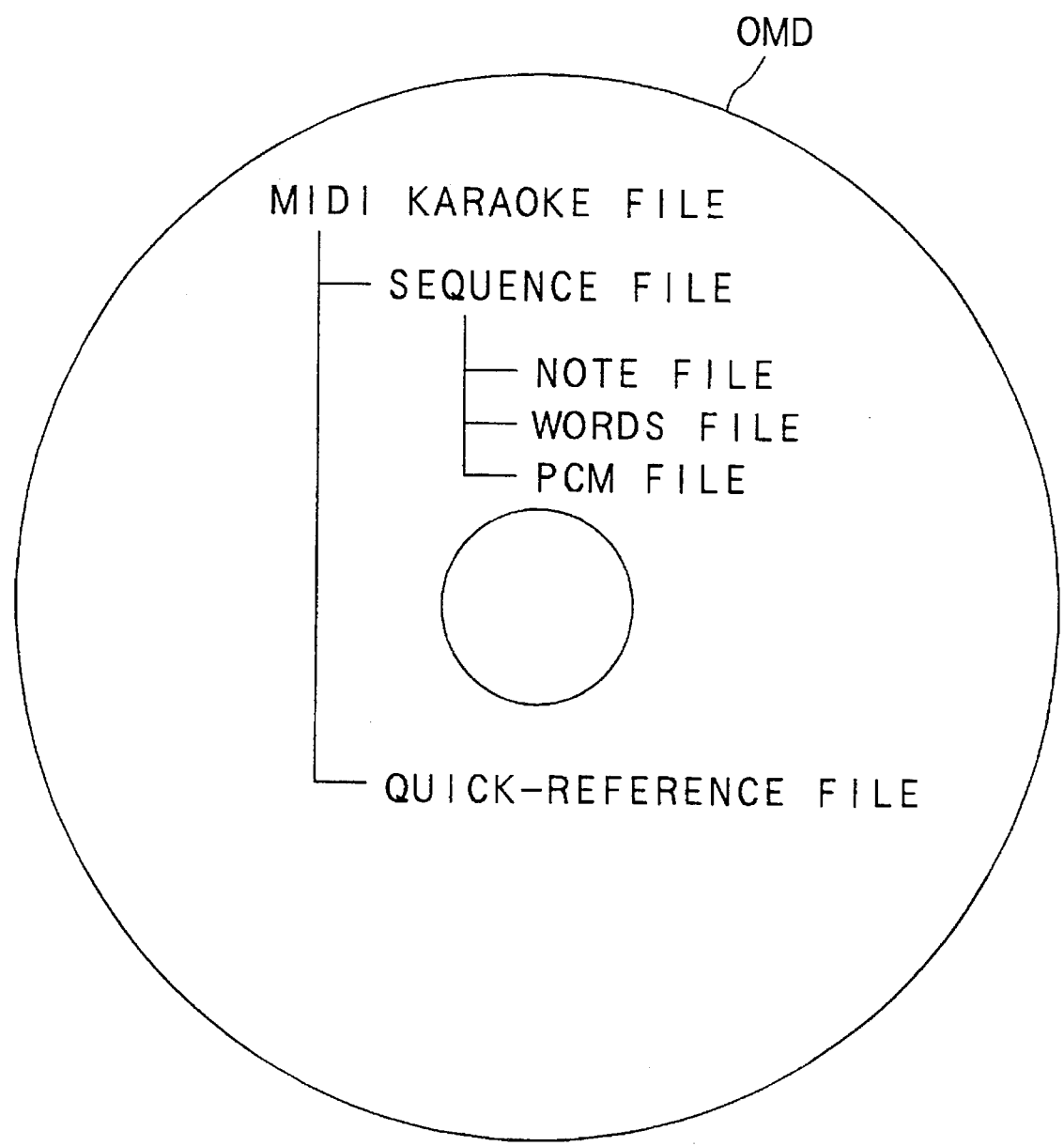
FIG. 3 is a diagram explaining a MIDI karaoke file in embodiments of the present invention.

A rewritable optical memory disk (OMD) such as a magneto-optic disk is set in the OMDD 3, which is superior to the VTRs in terms of the searching time. The OMDD 3 can record digital play information regarding music pieces on the optical memory disk and read the information therefrom. More specifically, a MIDI karaoke file containing digital play information regarding music pieces has been recorded on the optical memory disk set in the OMDD 3. As shown in FIG. 3, the MIDI karaoke file is classified into a sequence file including data of playable music pieces and a quick-reference file used for request search. The sequence file is made up of a note file, a words file, and a PCM file. The note file stores, for each music piece, MIDI sound source data including data for setting a MIDI sound source, such data including a musical interval, volume, tone, rhythm, tempo and so on. The words file stores, for each music piece, words data such as a telop displayed on the monitor TV, and a timing map data indicating a timing for displaying words and a speed at which the display color of words is changed. The PCM file stores, for each music piece, data of effective sounds that cannot be generated by the MIDI sound source and back choruses. The quick-reference file stores data indicating the names of music pieces, the names of singers, the names of composers, the names of lyric writers, and the genre of music. A desired music piece can be searched for by using one of more pieces of data stored in the quick-reference file. The details of the MIDI karaoke file storing the above-mentioned MIDI karaoke data and a karaoke play apparatus which plays music using the MIDI karaoke data are shown in Japanese Laid-Open Patent Application No. 2-273733.

Figure 4:
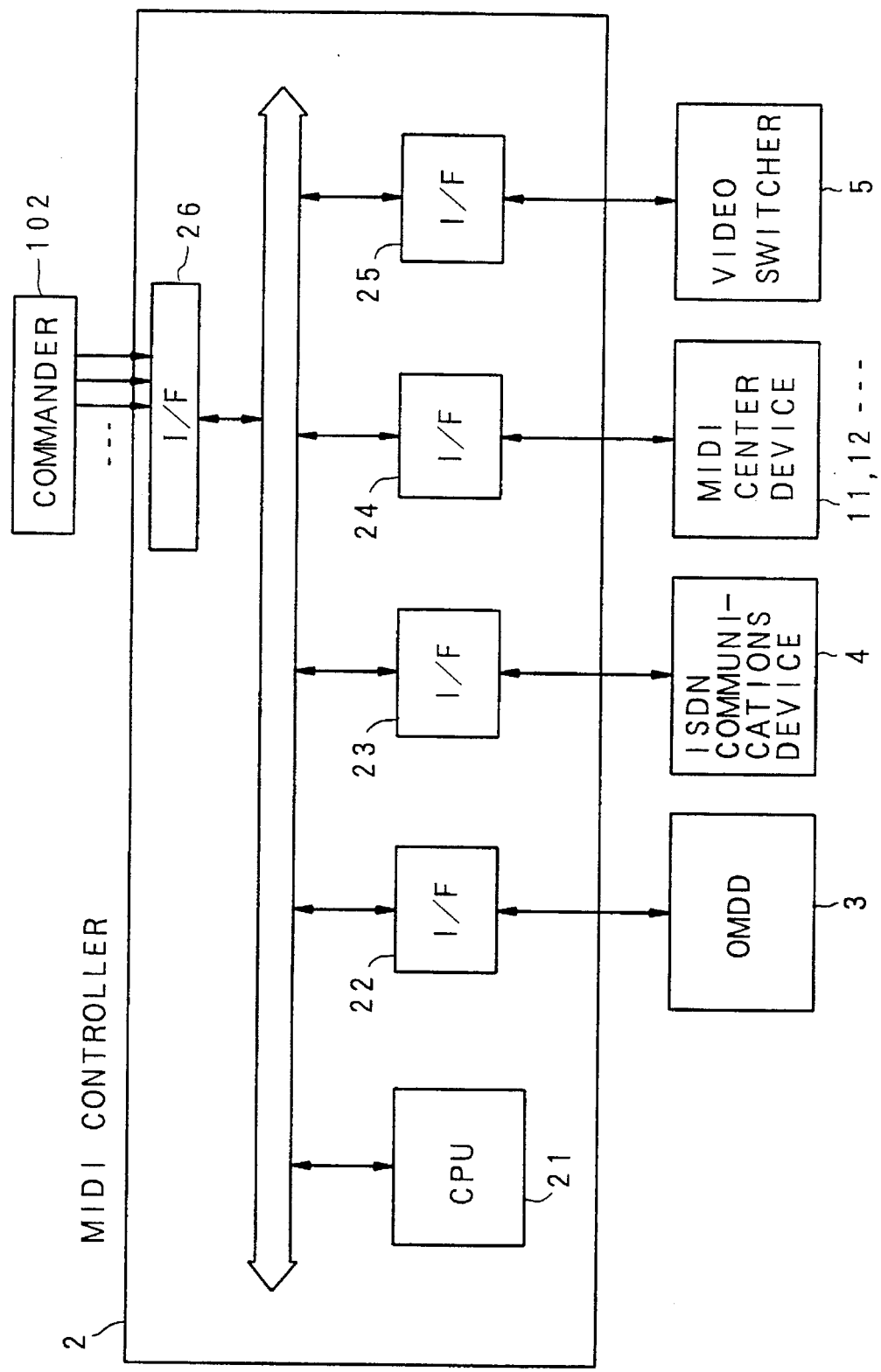
FIG. 4 is a block diagram of a MIDI controller used in embodiments of the present invention.

FIG. 4 shows the structure of the MIDI controller 2. As shown in FIG. 4, the MIDI controller 2 includes a CPU (Central Processing Unit) 21 and interfaces 22 through 26, and controls the OMDD 3, the ISDN communications device 4, the MIDI center devices 11, 12, . . . , and the video switcher 5 in accordance with commands from the commander 102. Request information from the terminal systems R1, R2, . . . is analyzed by the terminal controller 101. When a command is issued by the commander 102, the MIDI controller 2 reads the MIDI performance information of a requested music piece from the OMDD 3, and transfers the read information to the specified MIDI center device. In this manner, a playback process for a music piece to be played is activated. Simultaneously, the MIDI controller 2 identifies the genre of the specified music piece by referring to the quick-reference file, and supplies a corresponding switching signal to the video switcher 5. Separately from the playback control, MIDI performance information concerning a music piece newly released is input via the integrated service digital communications network under the control of the ISDN communications device, and is transferred to and stored in the OMDD 3.

Figure 5:
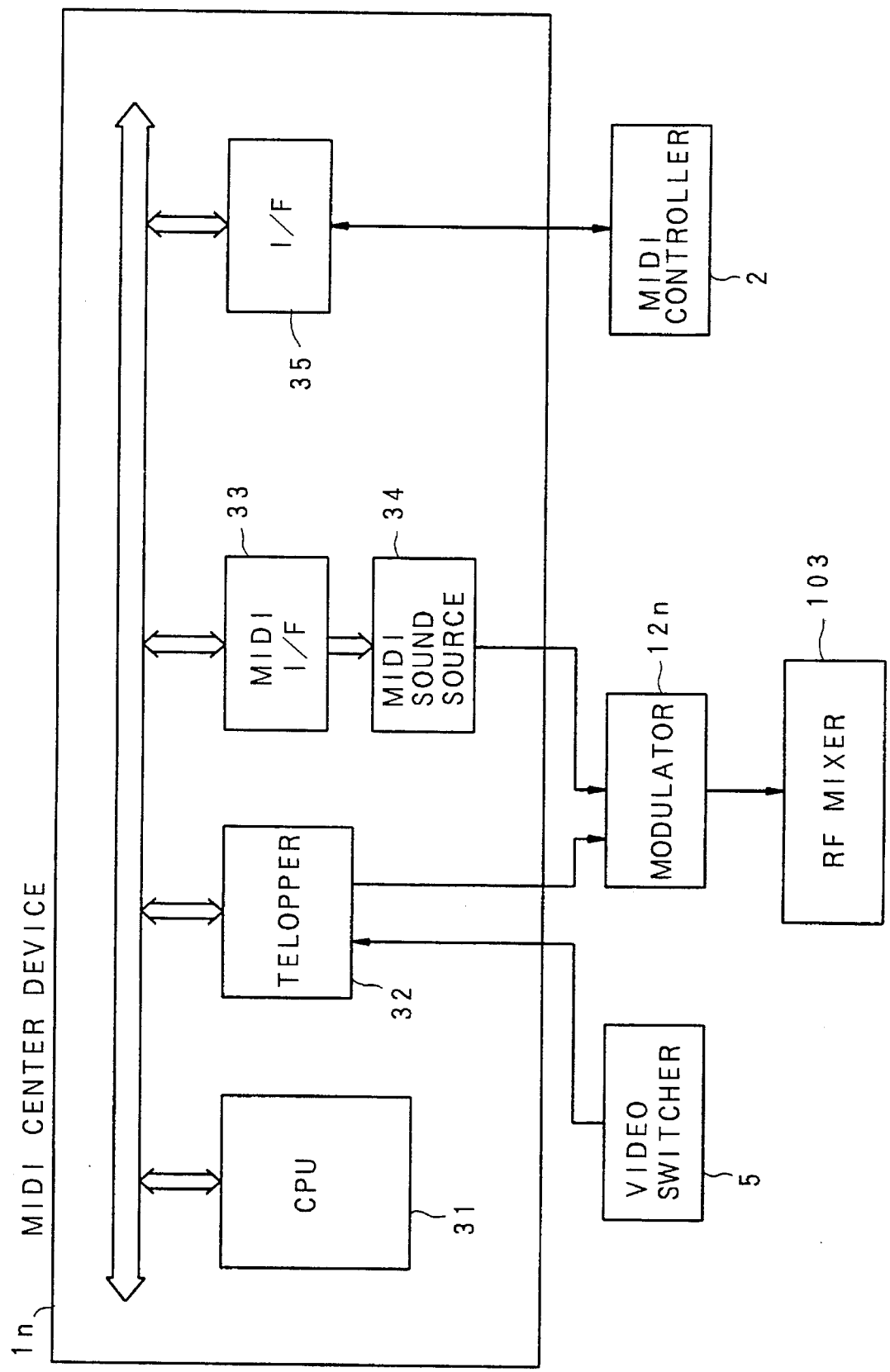
FIG. 5 is a block diagram of a MIDI center device used in embodiments of the present invention.

FIG. 5 shows the structures of the MIDI center devices 11, 12, . . . The MIDI center device in is made up of a CPU 31, a telopper 32, a MIDI interface 33, a MIDI sound source 34, and interface 35 with the MIDI controller 2. In the MIDI center device 1n, the MIDI performance information concerning a music piece to be performed from the MIDI controller 2 is received. The CPU 31 of the MIDI center device in temporarily stores the input information in an internal memory. Subsequently, a starting instruction is input to the CPU 31 from the MIDI controller 2, and the CPU 31 supplies the performance information stored in the internal memory to the MIDI sound source 34 via the MIDI interface 33, which generates a signal of the music piece to be performed. The above signal generated in the MIDI center device in is supplied to the modulator 12n. Simultaneously, the CPU 31 supplies data of the words stored in the internal memory to the telopper 32 at a timing indicated by the timing map data. The telopper 32 superimposes a words-data signal generated from the words data on the video signal output by the video switcher 5 at a predetermined position of the video signal, and supplies a superimposed signal to the modulator 12n. The modulator 12n transmits, as a TV signal, the video signal output by the telopper 32 and the signal (audio signal) of the music piece output by the MIDI sound source 34 to the terminal system that has issued the request via the RF mixer 103. Specifically, the modulator 12n, using UHF or VHF TV band of 6 MHz, for example, produces a composite signal of video signal having 4.5 MHz frequency band and FM-modulated audio signal whose carrier frequency is 4.5 MHz remote from that of the video signal. Therefore, the modulator 12n includes a mixing circuit for mixing the analog audio signal produced from the MIDI digital information with the video signal from the video switcher 5. As seen from FIG. 2, the terminal systems R1, R2, . . . do not have MIDI sound source. This is because not the MIDI digital information but the analog audio signal is transmitted to the terminal systems Rn in the above described manner.

The video switcher 5 receives the video signals respectively reproduced by the LDPs 61, 62, . . . , and supplies the video signals to the MIDI center devices 11, 12, . . . in accordance with the switching signal from the MIDI controller 2. The video images provided by the LDPs 61, 62, . . . are prepared in terms of the genre of music. For example, music is classified into country, pops or rock'-n'-roll, and each of these categories is further classified into spring, summer, fall and winter. In this case, 12 different kinds of video images are provided and it is enough to provide 12 LDPs for reproduction of these video images.

Figure 6:
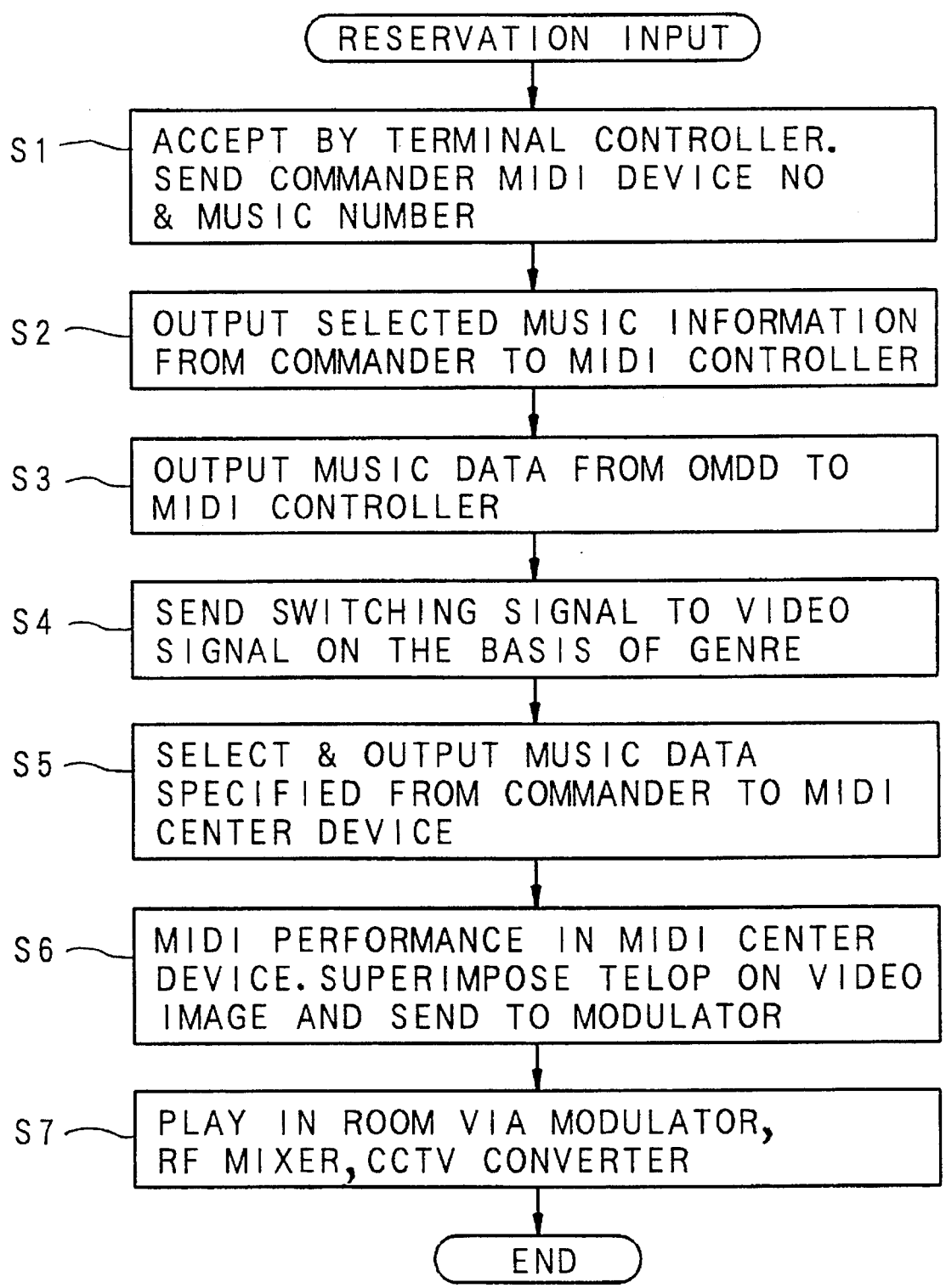
FIG. 6 is a flowchart of a process from a request for transmission of performance of the requested music in embodiments of the present invention.

A description will now be given of a sequence for requesting a music piece and transmitting the requested music in the above-mentioned CCTV karaoke system, with reference to the flowchart shown in FIG. 6.

At the terminal systems R1, R2, . . . , reservation inputs of requested music pieces are performed, and the CCTV converter 130 supplies request information to the CCTV center system 1. The request information is accepted and analyzed in the terminal controller 101, and the number of the MIDI center device to be operated and the number of the requested music piece are supplied to the commander 102 (step S1). The commander 102 supplies selected music information to the MIDI controller 2, which performs read control of the MIDI performance information concerning the requested music piece from the OMDD 3 using the selected music information (steps S2, S3). Then, the MIDI performance information is retrieved in order to detect data indicating the genre of the requested music piece. Then the switching signal corresponding to the identified genre is supplied to the video switcher 5 (step S4). The MIDI performance information read from the OMDD 3 is transferred, as music data, to the MIDI center device specified by the commander 102 (step S5). In the specified MIDI center device, the signal of the music piece to be played is generated from the MIDI performance information by means of the MIDI sound source 34. Further, the video signal in which the words are telop-imposed on the LDP video images is output via the video switcher 5. The above audio signal and the video signal are supplied to the corresponding modulator (step S6). In the modulator, the signal (audio signal) of the music piece to be played and the video signals are changed to a TV signal of an NTSC system having a range of 6 MHz, for example. The above TV signal is transmitted, via the RF mixer 103, to the CCTV converter 130 of the terminal system which has issued the request. Hence, the performance of the requested music is carried out at the room (step S7).

In the CCTV karaoke system according to the first embodiment of the present invention, the MIDI reproduction system is provided instead of the LD automatic changer/player units so that the audio signal and the video signal can be supplied to the terminal systems. The MIDI performance information includes digital information approximately equal to 40 kilobytes for a music piece, and it is possible to store, in an optical memory disk having a store capacity of hundreds of Megabytes, digital information concerning music pieces as many as or much more than music pieces provided by one conventional automatic changer. It is possible to instantaneously transfer data between the OMDD and the MIDI center devices by a high-capacity transfer means such as a SCSI and to hence provide a plurality of MIDI center devices with the data of the OMDD and immediately respond to a plurality of requests concurrently generated with little waiting time. As a result, it is possible to reduce the size of the overall system, as compared with the conventional LD automatic changer/player unit which accommodates one hundred and tens of optical disks, totally about 3500 music pieces and to flexibly cope with the number of rooms to which the musical performance service is provided. Further, it is easy to add a newly released music piece in a form of MIDI performance information, so that the cost and space can be reduced.

Figure 7:
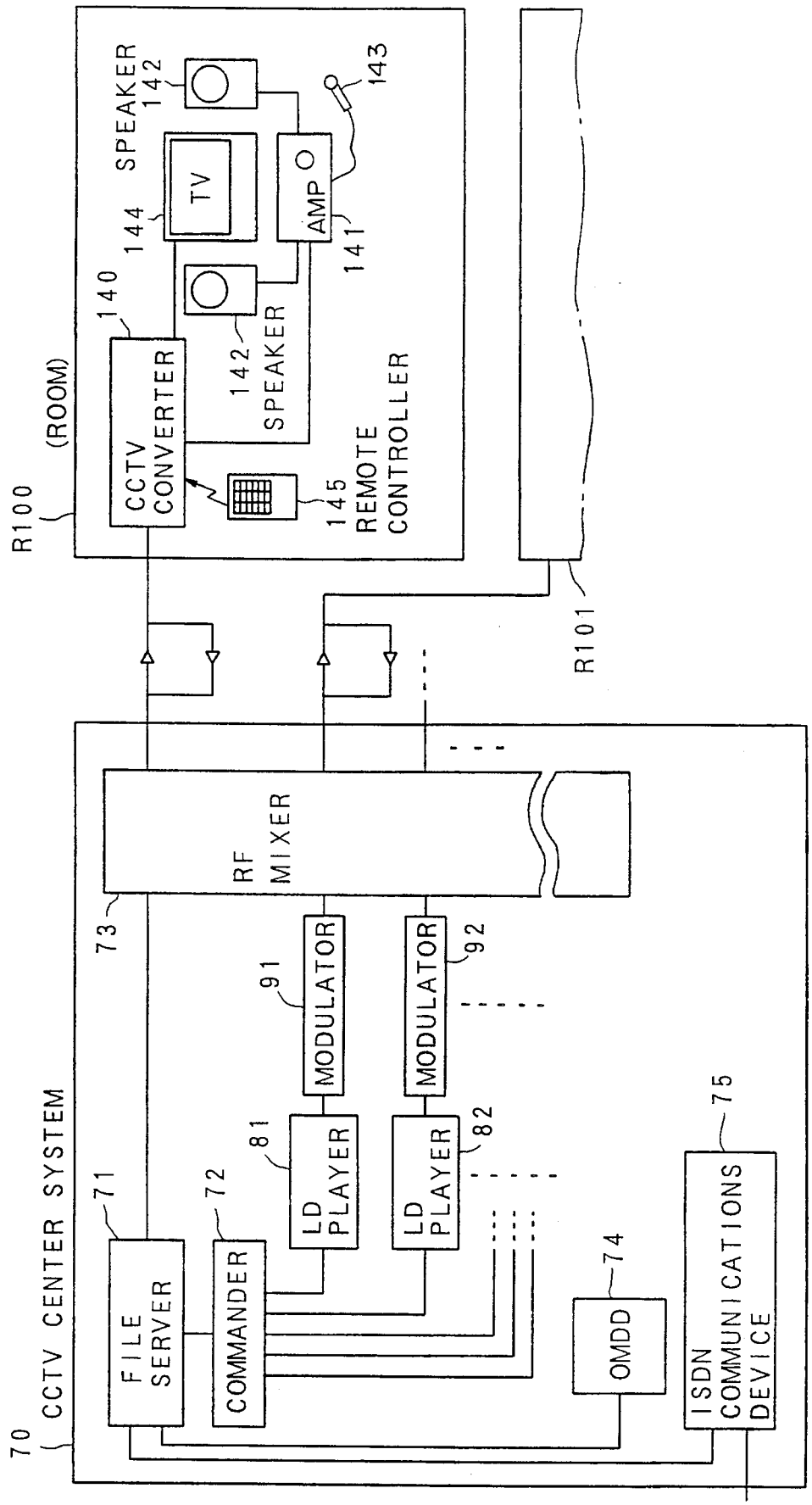
FIG. 7 is a block diagram of a karaoke system according to a second embodiment of the present invention.

2nd Embodiment:

FIG. 7 shows the structure of a CCTV karaoke system according to a second embodiment of the present invention.

The CCTV karaoke system according to the second embodiment of the present invention provides musical performance by means of the MIDI performance information as in the case of the above-mentioned first embodiment of the present invention shown in FIG. 2. The second embodiment of the present invention is characterized in that with respect to performance requests from terminal systems R100, R101, ..., a CCTV center system 70 provides these terminal systems R100, R101, ... with MIDI performance information concerning requested music pieces and video signals corresponding to the genre of the requested music pieces.

The CCTV center system 70 according to the second embodiment of the present invention includes a file server 71, a commander 72, an RF mixer 73, an OMDD 74, an ISDN communications device 75, LD players 81, 82, ..., and modulators 91, 92, ... The LD players 81, 82, ... store music pieces classified into country, pops or rock'-n'-roll, each being further classified into spring, summer, fall or winter, as in the case of the first embodiment of the present invention in which music pieces are classified into the 12 categories. One LD player having a single optical memory disk may be provided for a plurality of terminal systems R100, R101, ... It is also possible to provide a plurality of LD players on the basis of the number of terminal systems R100, R101, ... or the degree of demand. The video signals reproduced by the LD players are converted into RF signals by means of the modulators 91, 92, ..., and are transmitted as TV signals. The OMDD 74 has an optical memory disk storing MIDI karaoke files, which are MIDI performance information in the same manner as that in the first embodiment of the present invention. The read and write operations of the OMDD 74 are carried out under the control of the file server 71.

Figure 9:
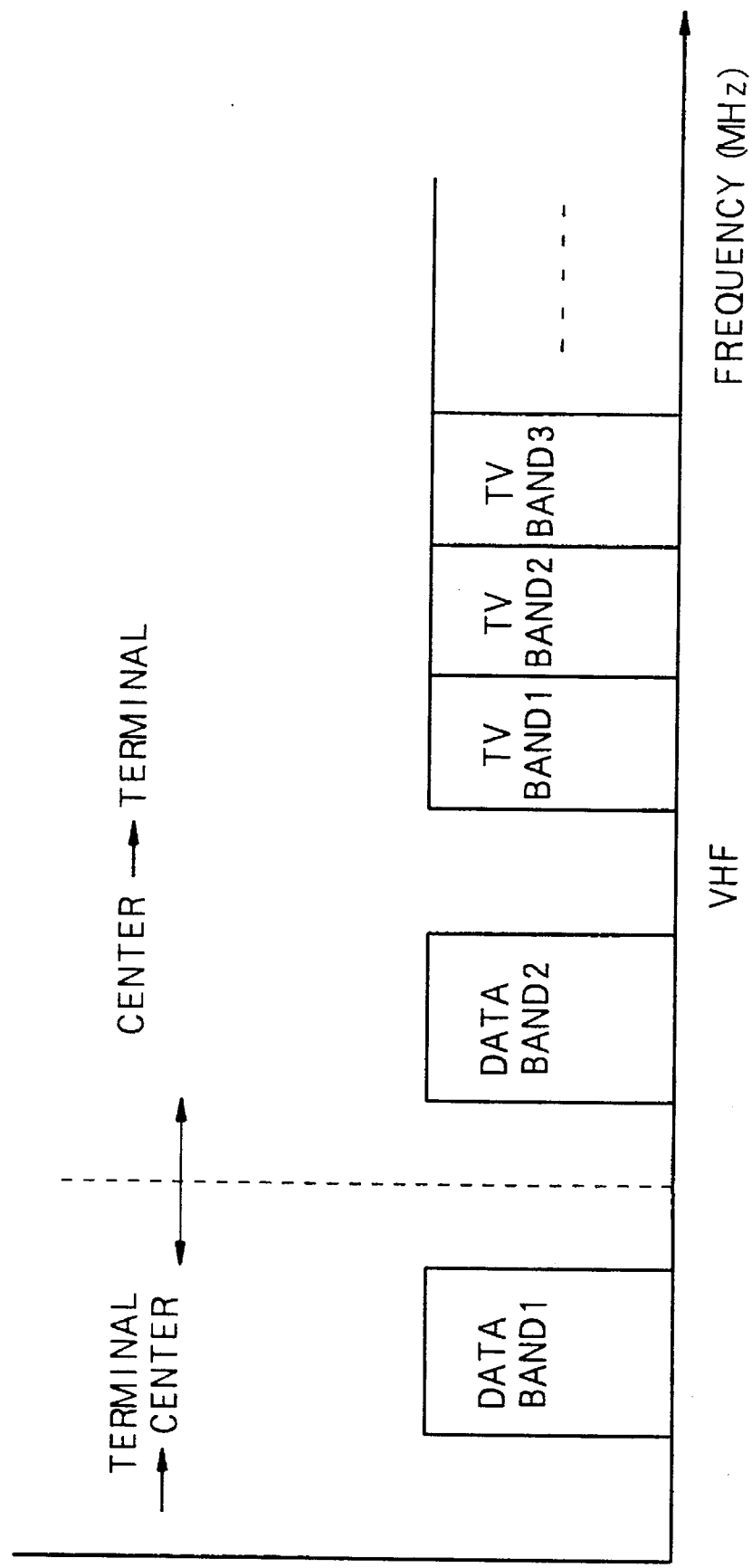
FIG. 9 is a diagram showing a data allocation of RF signal transmitted between center system and terminal systems.

FIG. 9 shows a data allocation of the RF signal transmitted between the center system 70 and the terminal systems Rn. Data band 2 is used for transmission of a data signal according to FSK (Frequency shift keying) from the center system to the terminal systems. Data band 1 is used for transmission of a data signal according to FSK from the terminal systems to the center system. As the data band 1 and 2, frequency band of 10 MHz is prepared by using the FSK at data rate of 2 Mbps (Bit per Second). In the VHF band, a plurality of TV bands are allocated.

In the CCTV center system 70, request information from the terminal systems R100, R101, ... are input to the file server 71 and are analyzed thereby. This request information is transmitted using the data band 1 in FIG. 9. On receipt of the request information from one of the terminal systems R100, R101, ..., the file server 71 reads the MIDI performance information concerning the received request information, and transfers the information to the terminal system that has issued the request. This MIDI performance information is conducted the FSK-modulation by the RF mixer 73 using the data band 2 in FIG. 9. The MIDI performance information is transferred at a bit rate of 2 Mbps. Even when a music piece consists of approximately 100 kilobytes, it takes approximately 0.4 seconds to transfer information concerning the music piece. Next, the file server 71 obtains data indicating the genre of the requested music piece from the MIDI performance information, and selects a chapter of the disk to be set in the LD player. Then, the file server 71 supplies an instruction to the commander 72, which activates the selected LD player, and performs a transmission control in which the output video signal of the selected LD player is transmitted to the terminal system which has issued the request. Further, the file server 71 receives MIDI performance information concerning a newly released music piece via the ISDN communications device 75, and transfers it to the OMDD 74 in which the transferred MIDI performance information is stored.

Figure 8:
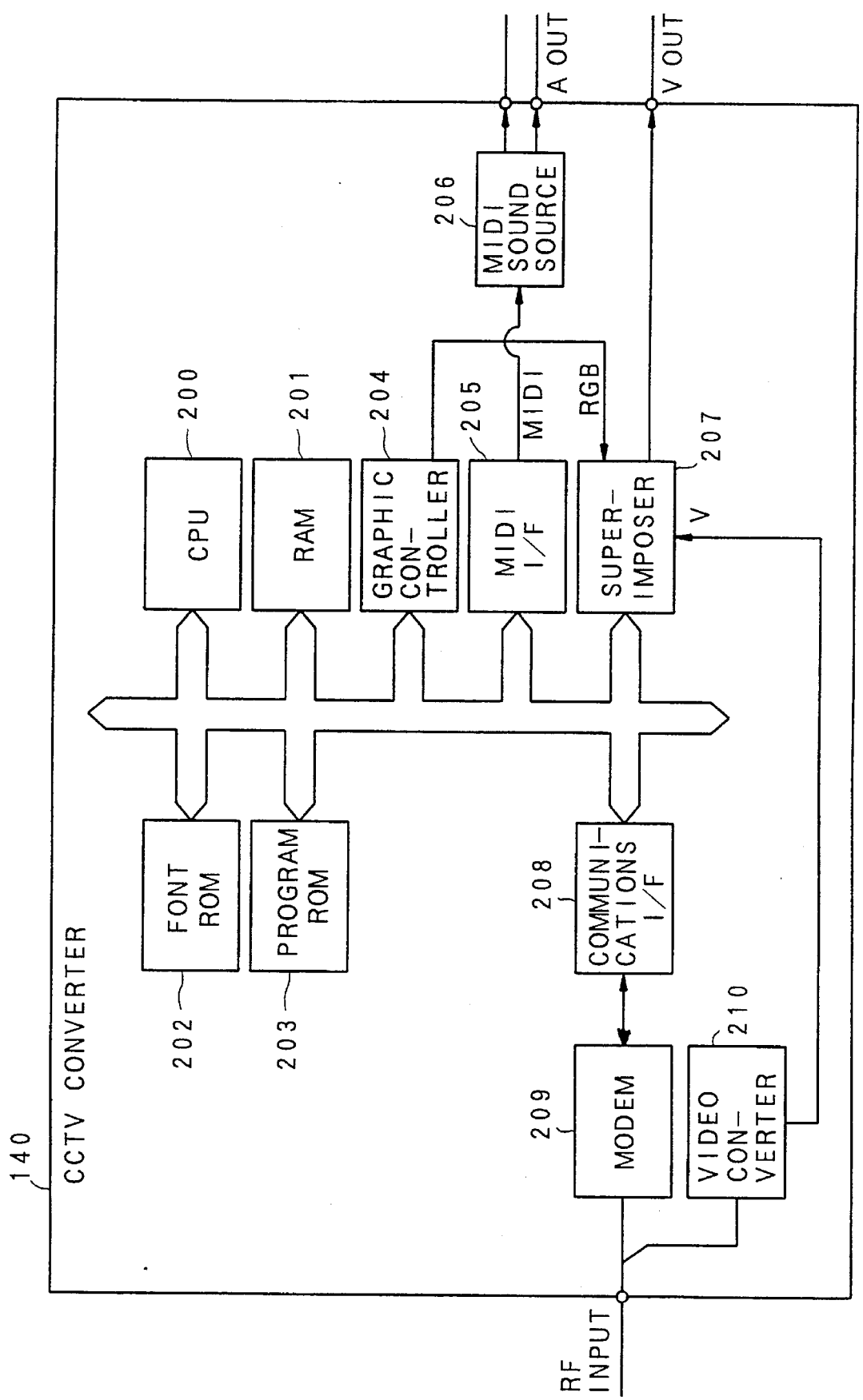
FIG. 8 is a block diagram of a CCTV converter used in the second embodiment of the present invention.

As shown in FIG. 7, each of the terminal systems R100, R101, ... is made up of a CCTV converter 140, a mixing amplifier 141, a speaker 142, a microphone 143, a television set 144 and a remote controller 145. As shown in FIG. 8, the CCTV converter 140 according to the second embodiment of the present invention is made up of a CPU 200, a RAM (Random Access Memory) 201, a program ROM (Read Only Memory) 202, a font ROM 203, a graphic controller 204, a MIDI interface 205, a MIDI sound source 206, a superimposer 207, a communications interface 208, a modem 209, and a video converter 210. Further, the CCTV converter 140 includes, in the communication I/F 208, an FSK demodulating unit for demodulating the FSK signal transmitted from the center system, a TV signal receiving unit for receiving the TV signal from the center system, a FSK modulating unit for producing the FSK-modulated signal to be transmitted to the center system, and a transmitting unit for transmitting the FSK-modulated signal to the center system. Using the FSK modulating unit and the transmitting unit, the request command from the remote controller 145 is transmitted to the center system as a digital information.

In the CCTV converter 140 having the above structure, MIDI performance information transmitted from the CCTV center system 70 is input via the modem 209 and the communications interface 208, and is temporarily stored in the RAM 201 under the control of the CPU 200. A video signal is separated by means of the video converter 210, and is supplied to the television set 144 via the superimposer 207. MIDI sound source performance data contained in the MIDI performance information stored in the RAM 201 is supplied to the MIDI sound source 206 via the MIDI interface 205 under the control of the CPU 200. In the MIDI sound source 206, a musical performance signal is generated and supplied to the mixing amplifier 141. As seen from FIG. 8, each of the terminal systems Rn includes a MIDI sound source 206. This is different from the construction of the first embodiment shown in FIG. 2. According to this construction, although the construction of the terminal system becomes relatively complicated, the cost of the whole system becomes lower if the number of the terminal system is relatively small.

Simultaneously, character fonts corresponding to the words are derived from data of the words by means of the font ROM 203 under the control of the CPU 200, and are supplied to the graphic controller 204. Then, the graphic controller 204 supplies R, G and B signals of the character fonts to the superimposer 207, and performs a words display control so that the words are displayed on a video image at predetermined positions. The above words display control displays characters and converts the color of an indication indicating the timing of singing in synchronism with generation of the musical performance signal from the MIDI sound source performance data using the timing map data. The ROM 203 stores character fonts which has character contours of the words clearly displayable on the screen.

In the CCTV center system in the aforementioned first embodiment of the present invention, the musical performance signal is generated and transmitted together with the video signal. Hence, it is necessary to provide MIDI center devices corresponding to the number of rooms. If the MIDI center devices corresponding to the number of rooms are not provided, a waiting time will occur. On the other hand, according to the second embodiment of the present invention, each terminal system is equipped with the MIDI sound source, and the musical performance signal is derived from the MIDI performance information transmitted from the CCTV center system. Hence, with respect to a request from each terminal system, the karaoke performance can be provided by reading and transmitting the MIDI performance information from the OMDD and by switching only the video signal to be provided. Hence, it becomes possible to shortly transfer the MIDI performance information that is digital performance information, as has been described previously and to provide the musical performance with little waiting time. Further, an increase in the number of music pieces to be provided can be coped with by simply adding an OMDD to the system. Furthermore, a new music piece can be provided from the ISDN communications device, and a disk maintenance of LD changer/player units or the like is not needed.

In the aforementioned first and second embodiments of the present invention, MIDI performance information according to the MIDI standard is used as digital performance information concerning music to be played. However, the present invention is not limited to the MIDI performance information, and is capable of using any digital performance information for generating a performance signal by means of a sound source. Although the first and second embodiments of the present invention are CCTV systems that provide only karaoke, karaoke can be integrated with other service functions normally provided, such as retransmission of a broadcasting wave, hotel information, provision of a requested video, broadcasting and so on, when the present invention is integrated with, for example, an in-hotel system. Further, the present invention can be applied to not only the CCTV system but also a CATV (Community Antenna Television or Cable Television) suitable for a wider area. Furthermore, the present invention can be applied to systems which provide only musical performance without video images.

Moreover, in the first and second embodiments of the present invention, digital performance information concerning a music piece newly released is input via the ISDN line circuit and is added to the available karaoke services. However, communications line circuits capable of carrying digital information can be used instead of the ISDN line circuits. A music piece newly released can be added to the available services by means of replacement of an optical memory disk.

According to the karaoke system of the present invention, digital performance information is stored and the signal, of music to be played can be derived from the digital performance information. Hence it becomes possible to flexibly cope with an increase in the number of rooms to which the musical performance service is provided as well as an increase in the number of music pieces and to considerably suppress increases in the cost and the space for placement. Further, it becomes possible to greatly reduce the waiting time necessary to start to performance of music after a request is input and to enjoy karaoke without substantial waiting time.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A karaoke system comprising:
   a plurality of terminal systems capable of respectively reproducing at the same time music and video images of music songs; and
   a center system connected to the plurality of terminal systems,
   said center system comprising:
      a unique musical performance information storage unit for storing digital performance information relating to music songs to be reproduced, said digital performance information including sequence data and reference data for each of the music songs, said sequence data including at least data relating to musical intervals, volume and words-of-song to be displayed on a monitor, said reference data including at least data relating to names of the music songs;
      a musical performance information transmitter for transmitting the digital performance information, for each of the music songs, read out from the musical performance information storage unit to the plurality of terminal systems, said musical performance information transmitter reading out the digital performance information for a music piece in a time period shorter than an actual playing time of the music piece;

a video image storage unit for storing a plurality of video images distributed in accordance with kinds of music songs;

a video image generator for generating a video image from the video image storage unit according to the kind of music song; and a video information transmitter for transmitting the generated video image to the plurality of terminal systems, each of the plurality of terminal systems comprising:

a music information generator for generating analog music information of the music songs on the basis of the transmitted digital performance information;

a music information reproducer for reproducing the music information as musical sound;

a video image reproducer for reproducing the transmitted video images simultaneous with the music information; and a video image mixer for generating a character image on the basis of the words-of-music data included in the digital performance information transmitted and superimposing the character image on the video images wherein said musical performance information transmitter transmits the digital performance information by a transmission frequency band different from that of the video information transmitter.

2. A karaoke system according to claim 1, wherein said center system further comprising modulator for modulating the digital performance information and video images into signals of radio frequency, respectively.

3. A karaoke system according to claim 1, wherein said center system further comprising communication unit for receiving the digital performance information relating to music pieces and transferring the received digital performance information to the musical performance information storage unit.

4. A karaoke system according to claim 1, wherein said video image storage unit stores video images corresponding to a plurality of genre of music pieces.

5. A karaoke system according to claim 1, wherein said digital performance information comprises MIDI sound source control information and said music information generator comprises MIDI sound source.

6. A method of transmitting music information from a center system to a plurality of terminal systems in a karaoke system, said center system comprising a unique storage unit and a plurality of music information generators, said method comprising the steps of:

receiving request signals from the terminal systems;

producing music song number data specifying a requested music song and generator number data specifying one of the music information generators on the basis of the request signals;

reading out digital performance information of each of the requested music songs from the storage unit in a time period shorter than an actual playing time of the music piece;

reading out video information corresponding to each of the requested music songs specified by the music song number data from a video image storage unit;

transmitting the digital performance information to the plurality of terminal systems by a transmission frequency band; and transmitting the video information to the plurality of terminal systems by a transmission frequency band different from that of the digital performance information.

7. A method according to claim 6, further comprising the steps of:

receiving the digital performance information and the video information transmitted from the center system;

generating analog music information of the music song on the basis of the transmitted digital performance information;

reproducing the analog music information as musical sound; and reproducing the video images on the basis of the transmitted video information in time-correspondence with the music information.

8. A method of transmitting music information from a center system to a plurality of terminal systems in a karaoke system, said center system comprising a unique storage unit and a plurality of music information generators, said method comprising the steps of:

receiving request signals from the terminal systems;

producing music song number data specifying a requested music song and generator number data specifying one of the music information generators on the basis of the request signals;

reading out digital performance information of each of the requested music songs from the storage unit in a time period shorter than an actual playing time of the music piece, said digital performance information including words-of-song information;

reading out video information corresponding to each of the requested music songs specified by the music song number data from a video image storage unit;

transmitting the digital performance information to the plurality of terminal systems by a transmission frequency band;

transmitting the video information to the plurality of terminal systems by a transmission frequency band different from that of the digital performance information;

receiving the digital performance information and the video information transmitted from the center system;

generating analog music information of the music song on the basis of the transmitted digital performance information;

reproducing the analog music information as musical sound;

reproducing the video images on the basis of the transmitted video information in time-correspondence with the music information; and generating character images on the basis of the word-of-song information and superimposing the character images on the video images.

* * * * *